Sept. 28, 1937.   K. T. M. SVENSSON   2,094,223
NONSKID TIRE CHAIN
Filed June 29, 1936
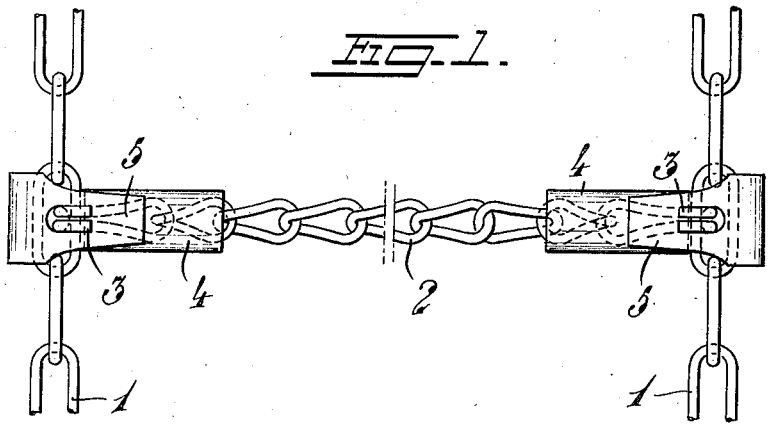
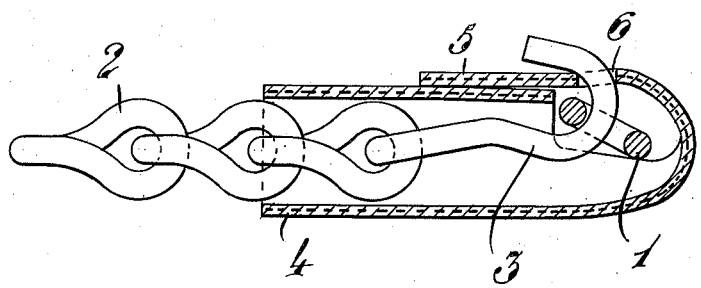
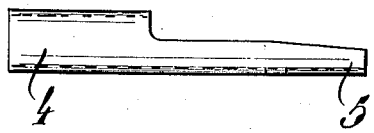
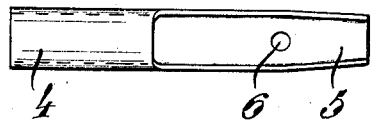
Inventor
Karl T. M. Svensson,
By Sommers & Young
Attys.

Patented Sept. 28, 1937

2,094,223

UNITED STATES PATENT OFFICE 2,094,223

NONSKID TIRE CHAIN

Karl Thore Martin Svensson, Vastervik, Sweden

Application June 29, 1936, Serial No. 88,020
In Sweden February 22, 1936

3 Claims. (Cl. 152—14)

This invention relates to non-skid tire chains and particularly to that class of such chains which comprises a pair of side chains and a plurality of traction chains or links connecting the side chains with each other. In non-skid chains of this type, the traction chains or links are most liable to wear out, and owing hereto various methods have been proposed for enabling an easy replacement of said traction chains or links, as by the use of hook-shaped connecting links at the ends of the traction chains by which the traction chains may be readily hooked on to and unhooked from the side chains. In connection with this type of non-skid chains, however, special means must be provided to prevent unintentional loosening of the traction chains from the side chains during the drive.

It is an object of this invention to provide a non-skid tire chain of this type in which the detachable traction chains are positively locked against unintentional loosening by simple means, which yet enable a quick and easy replacement of the traction chains when desired.

Another object of the invention is to provide a non-skid tire chain of the said type in which the means for locking the traction chains in their engagement with the side chains also present an effective protection of the tire against the damage as otherwise caused by the non-skid chain at the connecting points between the side chains and the traction chains.

According to my invention, the locking and protecting means above stated comprises sleeves, pieces of tubings or the like, made from a flexible or elastic material, which are put on the ends of the traction chains, including the connecting links, said sleeves or the like being formed with apertured tongues or flaps at one end, adapted to be placed around the respective links of the side chains and brought into engagement with the hooks of the connecting links, inasmuch as said hooks are caused to engage the apertures of the tongues or flaps.

The invention is illustrated by way of example in the accompanying drawing. Fig. 1 is a plan view of a section of the non-skid chain. Fig. 2 is a side-elevation of one end of a traction chain with a surrounding locking and protecting sleeve shown in section. Figs. 3 and 4 are side elevation and plan view, respectively, of the locking and protecting sleeve.

With reference to Fig. 1, the numeral 1 indicates portions of the pair of endless side chains which together with a plurality of traction chains form the non-skid chain. 2 indicates one of said traction chains. The traction chain shown carries at either end a connecting link 3 in the form of a permanently open hook which may be easily engaged into a link of the respective side chain and disengaged therefrom. On either end of the traction chain, including the connecting link, is put a sleeve or a piece of tubing 4 made from a flexible or elastic material, as india rubber or some sort of rubber fabric. At one end the sleeve 4 carries a tongue or flap 5, as will best appear from Figs. 3 and 4. Formed in said tongue or flap is an aperture 6.

Before the traction chains are hooked on to the side chains, the sleeves 4 are put on the ends of the traction chains so as to fit around the connecting link as well as around one or more of the adjacent links, with the hook-shaped end of the connecting link exposed above the tongue or flap. Then the connecting link is hooked on to a link of the respective side chain, and after that the tongue or flap 5 is fitted around this link and brought into engagement with the connecting link by causing the free end thereof to engage the aperture 6, as shown in Fig. 2. By this means the traction chain is positively locked to the side chain and cannot get free thereof until after the flap 5 has been disengaged from the connecting link 3. After the release of the flap 5, however, the traction chain may be easily unhooked from the side chain, whereupon quick and easy replacement of the traction chain may be effected.

The sleeve 4 not only forms a positively acting locking member between the traction chain and the side chain, but presents, in addition, an effective protecting device for the tire, by preventing the sides thereof from being damaged by the non-skid chain, and particularly by the connecting links thereof.

What I claim is:—

1. A non-skid tire chain comprising, in combination, a pair of side chains, traction chains, connecting links at the ends of said traction chains to detachably engage links of the side chains, and flexible sleeves fitted around said connecting links, said sleeves having projections adapted to be placed around the respective links of the side chains and to be then brought into engagement with the connecting links to lock same in their engagement with the links of the side chains.

2. A non-skid tire chain comprising, in combination, a pair of side chains, a plurality of traction chains, hook-shaped connecting links at the ends of said traction chains to detachably engage links of the side chains, sleeves of a flexible or elastic material put on the ends of the traction chains so as to fit around the connecting links while exposing the hooked end thereof, said sleeves being each formed with a tongue or flap at one end adapted to be bent around the respective links of the side chains, said tongue or flap having an aperture adapted to be engaged by the hooked end of the connecting link for locking same in its engagement with the side chain.

3. As a product of manufacture, in combination, an open coupling hook for chains, an open ended india rubber sleeve surrounding said hook, said sleeve being cut away to part of its length at one end approximately along a diametral plane so as to form a tongue adapted to be fitted around the hook, the said tongue having an aperture adapted to be engaged by the free end of the hook.

KARL THORE MARTIN SVENSSON.